United States Patent
Kawahara et al.

(10) Patent No.: US 11,105,270 B2
(45) Date of Patent: Aug. 31, 2021

(54) CONTROL DEVICE AND CONTROL METHOD FOR ROTARY MACHINE, AND ROTARY MACHINE UNIT EQUIPPED WITH CONTROL DEVICE

(71) Applicant: MITSUBISHI HEAVY INDUSTRIES COMPRESSOR CORPORATION, Tokyo (JP)

(72) Inventors: Tadashi Kawahara, Hiroshima (JP); Yoshiyuki Okamoto, Hiroshima (JP)

(73) Assignee: MITSUBISHI HEAVY INDUSTRIES COMPRESSOR CORPORATION, Tokyo (JP)

( * ) Notice: Subject to any disclaimer, the term of this patent is extended or adjusted under 35 U.S.C. 154(b) by 240 days.

(21) Appl. No.: 16/333,010

(22) PCT Filed: Sep. 27, 2016

(86) PCT No.: PCT/JP2016/078390
§ 371 (c)(1),
(2) Date: Mar. 13, 2019

(87) PCT Pub. No.: WO2018/061076
PCT Pub. Date: Apr. 5, 2018

(65) Prior Publication Data
US 2019/0264692 A1    Aug. 29, 2019

(51) Int. Cl.
*F02C 9/00* (2006.01)
*F02C 6/00* (2006.01)

(52) U.S. Cl.
CPC . *F02C 9/00* (2013.01); *F02C 6/00* (2013.01)

(58) Field of Classification Search
CPC ........ F02C 9/00; F02C 6/00; F05D 2270/052; F05D 2270/06; F05D 2270/335; H02P 6/08
See application file for complete search history.

(56) References Cited

U.S. PATENT DOCUMENTS

| | | | |
|---|---|---|---|
| 4,721,861 A | * | 1/1988 | Saito ...................... G05D 17/02 290/4 C |
| 4,771,606 A | | 9/1988 | Mose et al. |

(Continued)

FOREIGN PATENT DOCUMENTS

| | | |
|---|---|---|
| JP | S58-051122 B2 | 11/1983 |
| JP | S63-120804 A | 5/1988 |

(Continued)

OTHER PUBLICATIONS

International Search Report in corresponding International Application No. PCT/JP2016/078390, dated Dec. 13, 2016 (3 pages).

(Continued)

*Primary Examiner* — William H Rodriguez
(74) *Attorney, Agent, or Firm* — Osha Bergman Watanabe & Burton LLP

(57) ABSTRACT

A control device for a rotary machine, which is driven by a turbine output torque which is an output of a turbine and an electric motor output torque which is an output of an induction motor, includes: a required output setting unit configured to set a required torque for driving the rotary machine; and a drive source command unit configured to set the electric motor output torque to a minimum torque or higher of the induction motor and to set the turbine output torque to a value obtained by subtracting the electric motor output torque from the required torque when the turbine output torque is greater than or equal to a lower limit in a stable output range of the turbine.

5 Claims, 4 Drawing Sheets

(56) References Cited

U.S. PATENT DOCUMENTS

| | | | |
|---|---|---|---|
| 4,818,890 A | 4/1989 | Mose et al. | |
| 5,391,925 A * | 2/1995 | Casten | F02C 6/00 |
| | | | 290/1 R |
| 6,119,446 A * | 9/2000 | Shon | F02C 9/28 |
| | | | 60/773 |
| 2010/0141193 A1 * | 6/2010 | Rotondo | F01D 15/08 |
| | | | 318/432 |
| 2010/0319356 A1 * | 12/2010 | Takeda | F25J 1/0022 |
| | | | 60/773 |
| 2011/0138816 A1 | 6/2011 | Takeda et al. | |
| 2019/0368500 A1 * | 12/2019 | Epstein | F02C 9/50 |

FOREIGN PATENT DOCUMENTS

| | | |
|---|---|---|
| JP | S63-124797 A | 5/1988 |
| JP | 2010-004636 A | 1/2010 |
| WO | 2009-084250 A1 | 7/2009 |
| WO | 2010-055723 A1 | 5/2010 |

OTHER PUBLICATIONS

Written Opinion in corresponding International Application No. PCT/JP2016/078390, dated Dec. 13, 2016 (11 pages).

\* cited by examiner

CONTROL DEVICE AND CONTROL METHOD FOR ROTARY MACHINE, AND ROTARY MACHINE UNIT EQUIPPED WITH CONTROL DEVICE

TECHNICAL FIELD

The present invention relates to a control device and a control method for a rotary machine, and a rotary machine unit equipped with a control device.

BACKGROUND ART

In the related art, in a rotary machine such as a compressor, a centrifugal fan, and a centrifugal blower, a configuration in which a turbine is connected as a first drive output source and an electric motor is connected as a second drive output source is known.

For example, Patent Document 1 describes a compressor unit in which a driving force of a turbine is provided to a compressor and a driving force of an electric motor is applied to the compressor if necessary. A control device in the compressor unit sets an output required for a turbine on the basis of each of output conditions such as a pressure and a compression ratio of a compressed gas discharged from the compressor.

CITATION LIST

Patent Literature

[Patent Document 1]
PCT International Publication No. WO2009/084250

SUMMARY OF INVENTION

Technical Problem

Incidentally, in order to detect a ground fault of an electric motor, it is necessary to supply electric power to an electric motor and drive the electric motor with a predetermined minimum torque.

However, when an electric motor is driven to detect a ground fault in a state in which a turbine is driven with a torque of the turbine determined by a control device, there is a problem that a difference between a required torque set in the control device and an actual sum torque of the turbine and the electric motor is generated.

An objective of the present invention is to provide a control device and a control method for a rotary machine and a rotary machine unit equipped with a control device in which a ground fault detection in an induction motor is possible and a difference between a required torque set for driving a compressor and an actual sum torque of a turbine and an electric motor can be reduced in the control device for the rotary machine driven using the turbine and the induction motor.

Solution to Problem

According to a first aspect of the present invention, a control device for a rotary machine which is driven by a turbine output torque which is an output of a turbine and an electric motor output torque which is an output of an induction motor includes: a required output setting unit configured to set a required torque for driving the rotary machine; and a drive source command unit configured to set the electric motor output torque to a minimum torque or higher of the induction motor and to set the turbine output torque to a value obtained by subtracting the electric motor output torque from the required torque when the turbine output torque is greater than or equal to a lower limit in a stable output range of the turbine.

With such a configuration, a ground fault detection in the induction motor becomes possible by setting the induction motor to have the minimum torque or higher when the turbine output torque is greater than or equal to the lower limit in the stable output range of the turbine. Furthermore, it is possible to reduce the difference between a required torque and the actual sum torque of a turbine and an induction motor by setting the turbine output torque to a value obtained by subtracting an electric motor output torque from a required torque.

The control device for a rotary machine includes an output determination unit configured to determine whether the required torque is greater than a reference torque set in advance in the stable output range of the turbine, wherein the drive source command unit may set a torque of the induction motor to a value greater than the minimum torque when it is determined by the output determination unit that the required torque is greater than the reference torque.

With such a configuration, the reference torque to start driving of the induction motor is set in the stable output range of the turbine in advance and it is unnecessary to synchronize the induction motor with the turbine in an unstable state in the vicinity of a rated output of the turbine when driving of the induction motor is started. In other words, the rotary machine can be operated by causing a smooth transition from an output from the independent turbine to an output from the turbine and the induction motor and it is possible to eliminate temporary useless decrease and increase in the turbine output torque as in the related art.

According to a second aspect of the present invention, a rotary machine unit includes: a turbine and an induction motor as driving sources; a rotary machine connected to the turbine and the induction motor; and the above-described control device for a rotary machine.

According to a third aspect of the present invention, a control method for a rotary machine which is driven by a turbine output torque which is an output of a turbine and an electric motor output torque which is an output of an induction motor includes: a step of setting a required torque for driving the rotary machine; and a step of setting the electric motor output torque to a minimum torque or higher of the induction motor and setting the turbine output torque to a value obtained by subtracting the electric motor output torque from the required torque when the turbine output torque is greater than or equal to a lower limit in a stable output range of the turbine.

The control method for a rotary machine may include a step of determining whether the required torque is greater than a reference torque set in advance in the stable output range of the turbine; and a step of setting a torque of the induction motor to a value greater than the minimum torque when it is determined that the required torque is greater than the reference torque.

Advantageous Effects of Invention

According to the present invention, a ground fault detection in an induction motor becomes possible by setting an induction motor to have a minimum torque or higher when a turbine output torque is greater than or equal to a lower limit in a stable output range of a turbine. Furthermore, it is possible to reduce a difference between a required torque and an actual sum torque of a gas turbine and an induction motor by setting the turbine output torque to a value obtained by subtracting an electric motor output torque from a required torque.

DESCRIPTION OF EMBODIMENTS

Figure 1:
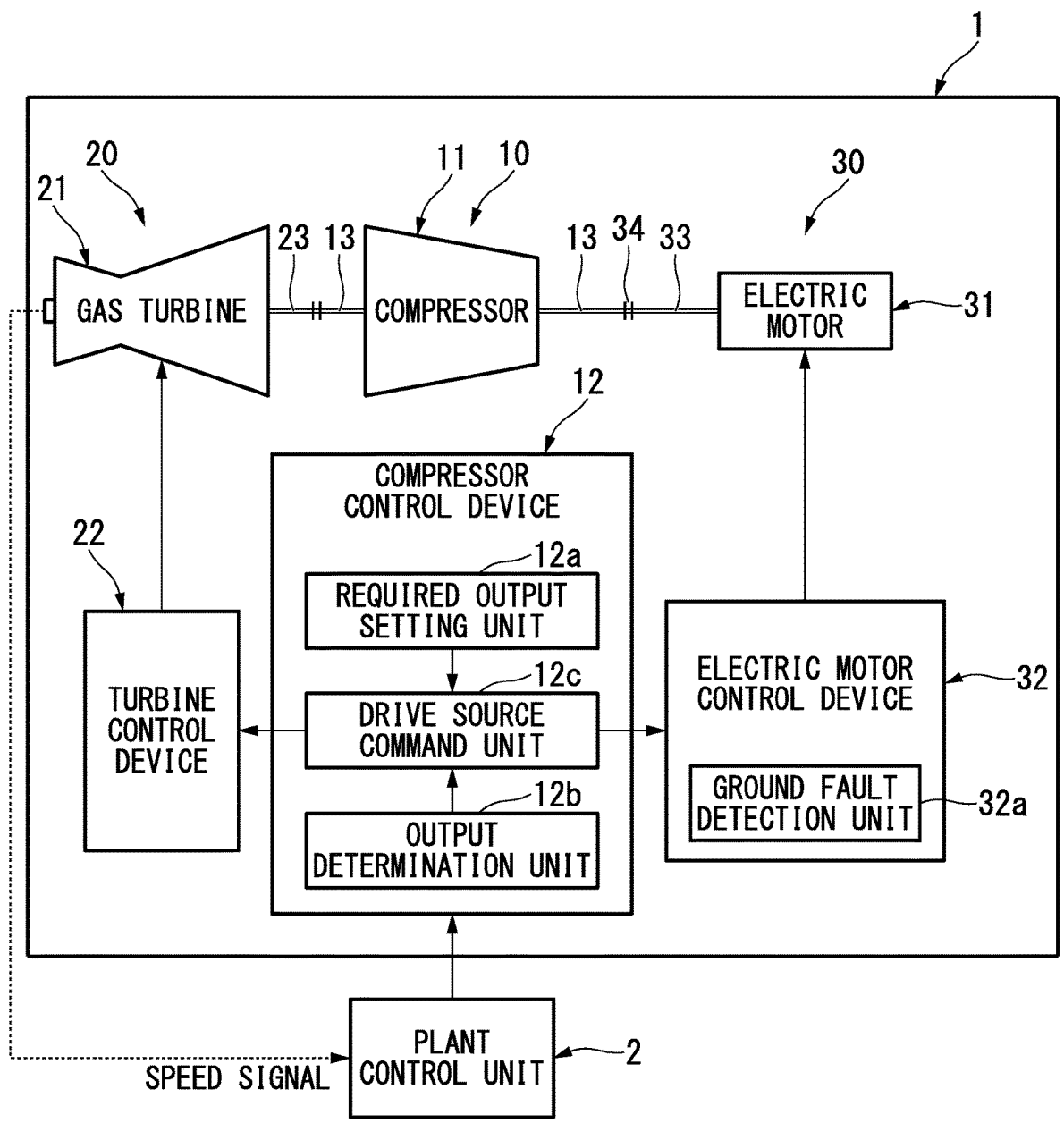
FIG. 1 is a block diagram showing an outline of a compressor unit in an embodiment of the present invention.

A compressor unit which is a rotary machine unit according to an embodiment is, for example, a unit applied to a liquefaction plant for natural gas. As shown in FIG. 1, a compressor unit 1 includes a compressor 10 (rotary machine), a gas turbine 20 (turbine) configured to generate a driving force as a driving source to rotate a rotating shaft 13 in the compressor 10, and an induction motor 30 (electric motor).

The gas turbine 20 includes a turbine main body 21 having a turbine output shaft 23 connected to the rotating shaft 13 in the compressor 10 and a turbine control device 22 configured to control the turbine main body 21 to be driven at a predetermined output. The induction motor 30 includes an electric motor main body 31 having an electric motor output shaft 33 connected to the rotating shaft 13 in the compressor 10 via a coupling and an electric motor control device 32 configured to control the electric motor main body 31 to be driven at a predetermined output.

The compressor 10 includes a compressor main body 11 having the rotating shaft 13 connected to output shafts 23 and 33 of the gas turbine 20 and the induction motor 30 and a compressor control device 12 configured to control the compressor main body 11.

The induction motor 30 is an auxiliary electric motor configured to assist the gas turbine 20 which drives the compressor 10. The induction motor 30 includes a stator having a winding structure and a rotor. The induction motor 30 generates a rotating magnetic field when an alternating current (AC) voltage is applied to the stator and generates an induced electromotive force in the rotor due to the rotating magnetic field. The rotor rotates when a rotational force occurs in the same direction as the rotating magnetic field due to the interaction between a current caused by an induced electromotive force and the rotating magnetic field.

The electric motor control device 32 includes an inverter which is a frequency conversion device configured to change a frequency of electric power to be supplied. The inverter in the embodiment has no a regeneration function (a function of returning electric power to an electric power source side). Thus, in the induction motor 30 in the embodiment, when an output frequency of the inverter is smaller than the number of rotations of the induction motor 30, the induction motor 30 is in a power generation mode. Thus, the inverter trips (stops).

The electric motor control device 32 includes a ground fault detection unit 32a configured to detect a ground fault of the induction motor 30.

The compressor control device 12 is connected to a plant control unit 2 configured to control the entire plant having the compressor unit 1 installed therein. A signal of a pressure, a compression ratio, a speed, and the like of a compressed gas discharged from the compressor 10 is input to the plant control unit 2. The compressor control device 12 controls the compressor main body 11 on the basis of the input from the plant control unit 2 and performs an input on the turbine control device 22 and the electric motor control device 32.

Each output condition of the pressure, the compression ratio, the speed, and the like of the compressed gas discharged from the compressor 10 is input from the plant control unit 2 to the compressor control device 12 as an input signal. The compressor control device 12 includes a required output setting unit 12a configured to set a required torque T required to drive the compressor 10 on the basis of the input signal and the like.

It should be noted that the required torque T is a concept which includes a target speed corresponding to each output condition of the compressed gas in the compressor 10 based on the input signal and a torque set at a certain time in a process of increasing or decreasing the speed from a current speed to the target speed.

The compressor control device 12 includes an output determination unit 12b configured to determine whether to drive the induction motor 30 on the basis of the required torque T set by the required output setting unit 12a.

The output determination unit 12b has a function of determining whether a torque of the gas turbine 20 has reached a lower limit T1 (refer to FIG. 4) of a stable output range of the gas turbine 20 and a function of determining whether the required torque T is greater than a reference torque T2 set in advance.

The stable output range is an output range in which the gas turbine 20 can stably change an output (torque).

The reference torque T2 set in the output determination unit 12b is less than a rated torque T3 of the gas turbine 20 and is set in a high output section in the stable output range of the gas turbine 20. For example, the reference torque T2 is set to 90% of the rated torque T3 as the high output section in the stable output range of the gas turbine 20.

The reference torque T2 which is in the high output section in the stable output range of the gas turbine 20 is set to 90% of the rated torque T3, but the stable output range of the gas turbine 20 is determined for each gas turbine 20 and the high output section is preferably a value in which an upper limit of the stable output range or a certain margin is taken into account.

The compressor control device 12 includes a drive source command unit 12c configured to instruct each of the turbine control device 22 and the electric motor control device 32 on the basis of the determination result of the output determination unit 12b and the required torque T and to drive the turbine main body 21 and the electric motor main body 31. That is, the drive source command unit 12c sets a torque of the gas turbine 20 (turbine output torque Tt) and a torque of the induction motor 30 (electric motor output torque Tm) on the basis of the determination result of the output determination unit 12b and the required torque T.

The drive source command unit 12c has a function of setting the induction motor 30 to a minimum torque Tm1 when the turbine output torque Tt is greater than or equal to the lower limit T1 of the stable output range of the gas turbine 20. That is, the compressor control device 12 instructs the electric motor control device 32 so that, in a case that the gas turbine 20 starts up and the turbine output torque Tt is greater than or equal to the lower limit T1 of the stable output range of the gas turbine 20, even when the set required torque T is low and it is unnecessary to add the driving force of the induction motor 30, the induction motor 30 is driven with a torque greater than or equal to the minimum torque Tint.

Here, the minimum torque Tm1 of the induction motor 30 is a minimum torque in which the induction motor 30 can output in a stable state in a state in which the induction motor 30 has started up. The minimum torque Tm1 of the induction motor 30 in the embodiment is, for example, 10% of a rated torque of the induction motor 30.

Also, the drive source command unit 12c has a function of setting the turbine output torque Tt to a torque obtained by subtracting the electric motor output torque Tm from the required torque T. That is, the turbine output torque Tt is calculated by the following expression (1):

$$Tt = T - Tm \quad (1).$$

Thus, even when the induction motor 30 is driven with the minimum torque Tm1, a sum torque of the gas turbine 20 and the induction motor 30 is maintained at the set required torque T.

An action of the compressor unit 1 and control by the compressor control device 12 in the embodiment will be described in detail below on the basis of the flowcharts shown in FIGS. 2 and 3.

[Starting-Up Method and Operating Method]

Figure 2:
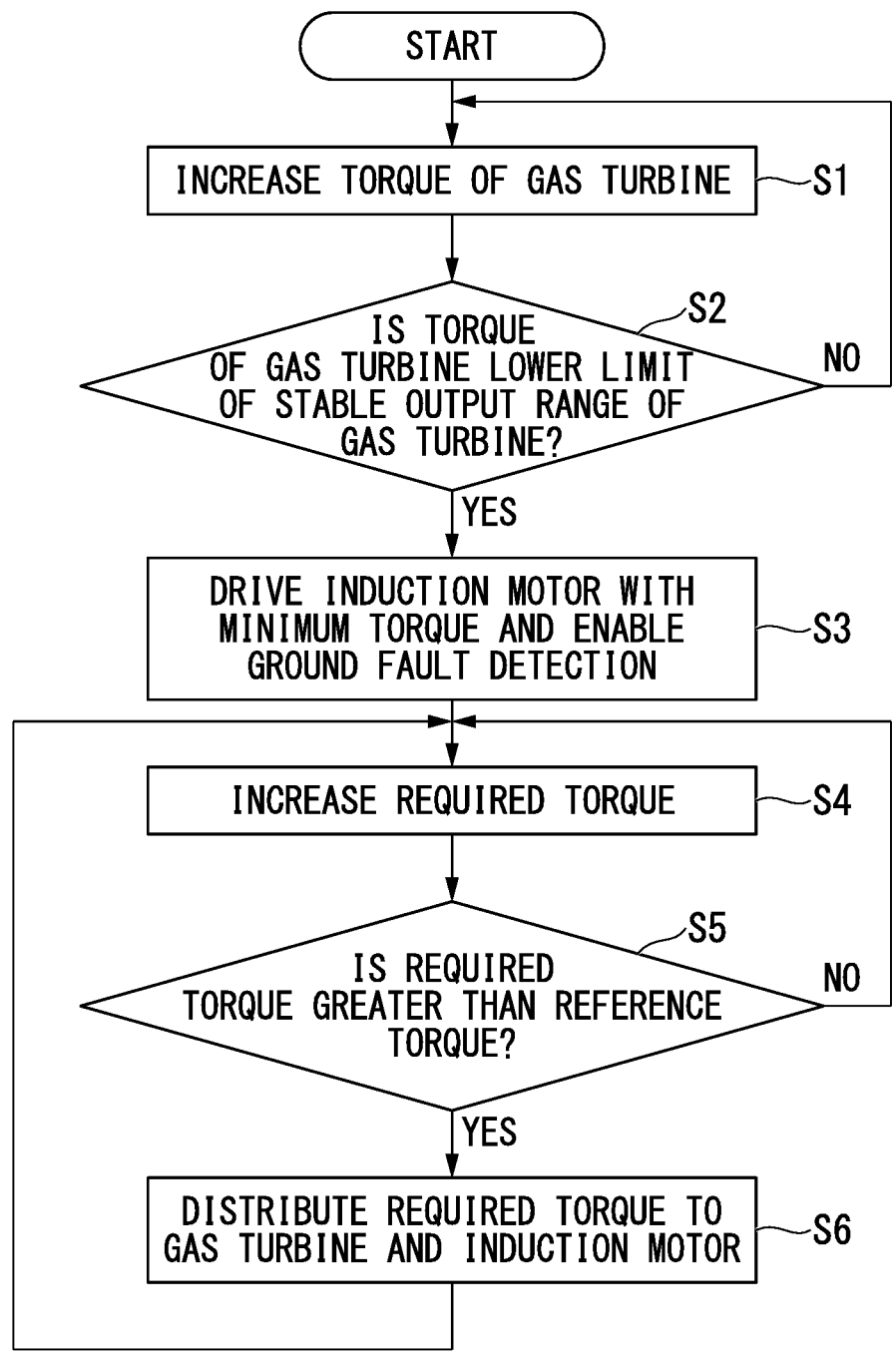
FIG. 2 a flowchart showing a starting-up method and an operating method in a compressor control device in the embodiment of the present invention.

As shown in FIG. 2, when an operation of the compressor unit 1 starts, the required output setting unit 12a calculates the required torque T on the basis of an input from the plant control unit 2.

In Step S1, the required output setting unit 12a in the compressor control device 12 changes the required torque T to increase a torque output of the gas turbine 20 (turbine torque Tt).

Subsequently, in Step S2, the output determination unit 12b in the compressor control device 12 determines whether the turbine output torque Tt has reached the lower limit T1 of the stable output range. When the turbine output torque Tt has not reached the lower limit of the stable output range (NO), increasing the output of the gas turbine 20 continues.

When it is determined that the turbine output torque Tt has reached the lower limit T1 of the stable output range (YES), in Step S3, the drive source command unit 12c starts up the induction motor 30 and sets the electric motor output torque Tm to the minimum torque Tm1.

Here, the drive source command unit 12c sets the turbine output torque Tt to a torque obtained by subtracting the electric motor output torque Tm from the required torque T. That is, the turbine output torque Tt is reduced in correspondence with a torque increased when the induction motor 30 is driven. Thus, even when the induction motor 30 is driven, the set required torque T is maintained without changing the sum torque of the gas turbine 20 and the induction motor 30.

Also, in Step S3, the ground fault detection unit 32a in the electric motor control device 32 enables a ground fault detection in the induction motor 30. The ground fault detection unit 32a performs a process such as tripping the induction motor 30 when a ground fault is detected.

Here, when power required for the compressor 10 increases due to an increase in load on the plant, in Step S4, the plant control unit 2 increases the required torque T.

Subsequently, in Step S5, the output determination unit 12b determines whether the required torque T is greater than the reference torque T2. Moreover, when the required torque T is lower than or equal to the reference torque T2 (YES), that is, when the required torque T is 90% or lower of the rated torque T3 of the gas turbine 20 in the embodiment, the drive source command unit 12c instructs the turbine control device 22 to drive the turbine main body 21 without adding the driving force of the induction motor 30.

On the other hand, when it is determined by the output determination unit 12b that the required torque T is greater than the reference torque T2 in Step S5 (NO), in Step S6, the drive source command unit 12c distributes the required torque T to the turbine output torque Tt and the electric motor output torque Tm. To be specific, the turbine output torque Tt is set to be higher than or equal to the reference torque T2 and lower than or equal to the rated torque T3. Moreover, the electric motor output torque Tm is set to a value obtained by subtracting a set value of the turbine output torque Tt from the required torque T.

Subsequently, the turbine control device 22 is instructed to drive the turbine main body 21 in accordance with the distributed torque and the electric motor control device 32 is also instructed to drive the electric motor main body 31 with a torque greater than the minimum torque Tm1. Thus, the compressor 10 can operate by obtaining a driving force which is the required torque T as a whole driving source using the gas turbine 20 and the induction motor 30, that is, can operate by obtaining a driving force greater than or equal to the rated torque T3 of the gas turbine 20.

Here, even when the required torque T is reduced due to a decrease in load on the plant and the required torque T is smaller than the reference torque T2, the drive source command unit 12c sets the electric motor output torque Tm to the minimum torque Tm1 of the induction motor 30.

[Stopping Method]

Figure 3:
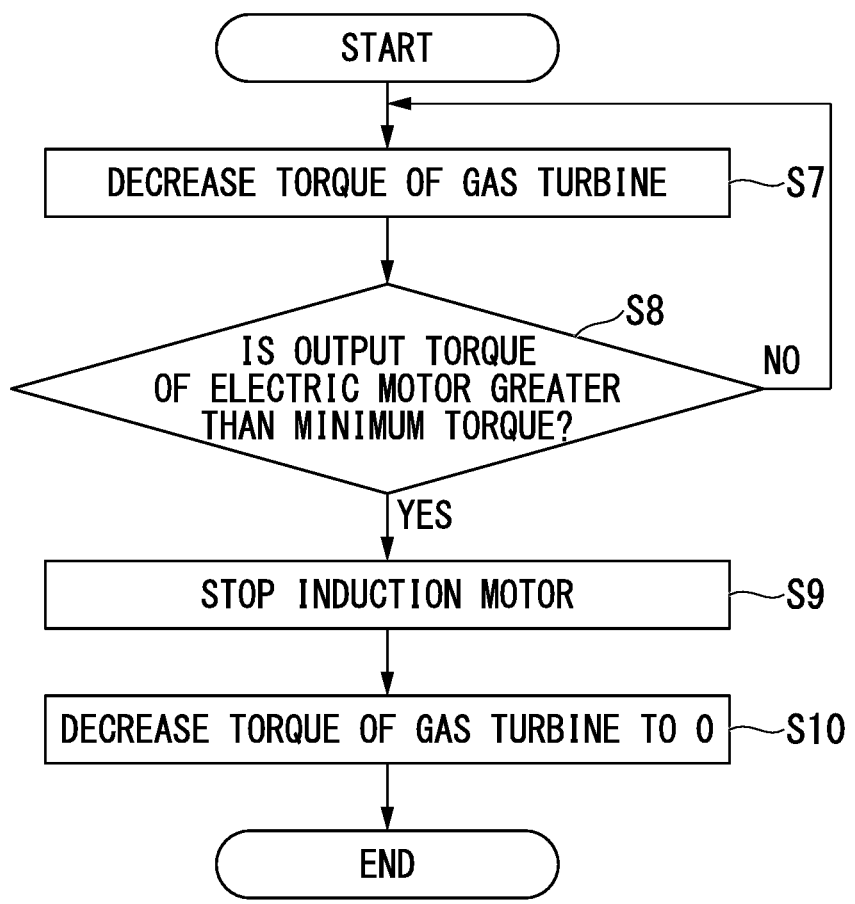
FIG. 3 is a flowchart showing a stopping method in the compressor control device in the embodiment of the present invention.

As shown in FIG. 3, when stopping the compressor unit 1, in Step S7, the required output setting unit 12a in the compressor control device 12 changes the required torque T to decrease the turbine output torque Tt.

Subsequently, in Step S8, the output determination unit 12b in the compressor control device 12 determines whether the electric motor output torque Tm is greater than the minimum torque Tm1. When the electric motor output torque Tm is less than or equal to the minimum torque Tm1, in Step S9, the drive source command unit 12c stops the induction motor 30.

Subsequently, in Step S10, the required output setting unit 12a reduces the required torque T until the number of rotations of the gas turbine 20 is 0 to decrease the turbine output torque Tt.

Figure 4:
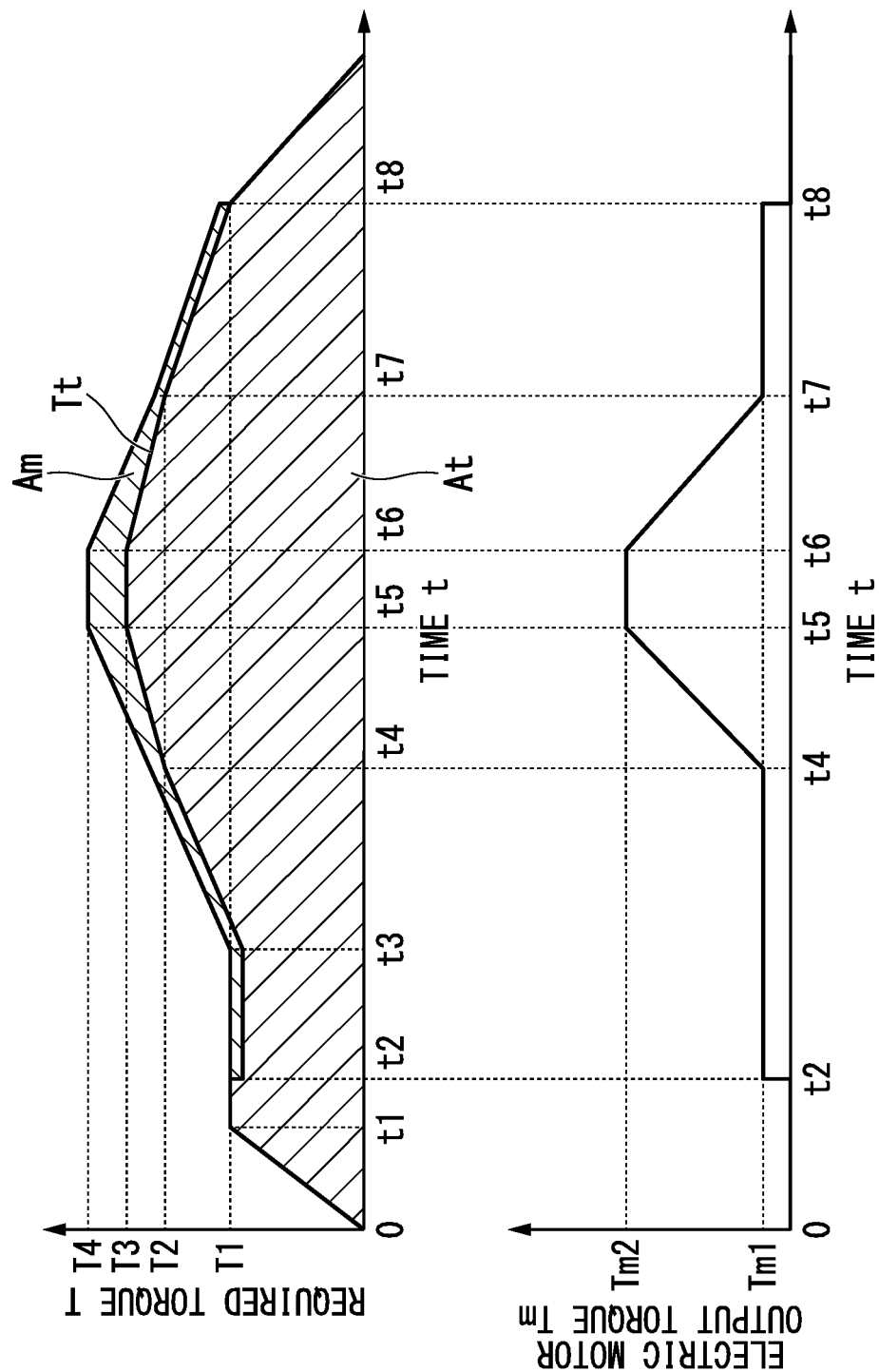
FIG. 4 is a graph showing an example of control through the compressor control device in the embodiment of the present invention and showing variation over time in a required torque.

FIG. 4 shows an example in which the gas turbine 20 and the induction motor 30 which are driving sources of the compressor unit 1 in the embodiment are controlled in accordance with the control procedure and the required torque T is changed in accordance with an input signal from the plant control unit 2.

As shown in FIG. 4, when an operation starts at time t=0, in Step S1, the compressor control device 12 increases the turbine output torque Tt to the lower limit T1 of the stable output range of the gas turbine 20 (Step S1).

At time t=t1, when it is determined that the turbine output torque Tt has reached the lower limit T1 of the stable output range of the gas turbine 20, the compressor control device 12 holds the turbine output torque Tt (Step S2).

Subsequently, at time t=t2, the compressor control device 12 sets the electric motor output torque Tm to the minimum torque Tm1. Thus, the induction motor 30 outputs the minimum torque Tm1 (Step S3).

Here, there is an interval between time t2 and time t1, but there is no limitation to this. The induction motor 30 may be driven with the minimum torque Tm1 at a stage at which the turbine output torque Tt has reached the lower limit T1 of the stable output range.

Also, at time t=t2, the drive source command unit 12c reduces the turbine output torque Tt corresponding to the minimum torque Tm1. Thus, the required torque T does not change before and after time t=t2.

Subsequently, at time t=t5, the required torque T at each time is calculated so that a target torque T4 is provided. Moreover, the turbine output torque Tt is increased and the electric motor output torque Tm is maintained at the minimum torque Tm1 until the required torque T is greater than the reference torque T2 (Step S4).

On the other hand, at time t=t4, when it is determined that the required torque T is greater than the reference torque T2, the required torque T is output to be distributed to the gas turbine 20 and the induction motor 30 (Step S5 and Step S6).

Here, a first range At shows an output by the gas turbine 20, a second range Am shows an output by the induction motor 30, and the required torque T is output as a sum of both.

At time t=t5, the drive source command unit 12c controls the gas turbine 20 and the induction motor 30 so that the electric motor output torque Tm reaches a rated torque Tm2 at the same time that a torque of the gas turbine 20 reaches the rated torque T3.

It should be noted that the control method is not limited to this and a time at which the turbine output torque Tt reaches the rated torque T3 may be different from a time at which the electric motor output torque Tm reaches the rated torque Tm2.

Also, when an output supplied to the compressor 10 at time t=t5 reaches a target torque T4 determined on the basis of an input signal from the plant control unit 2, the required torque T is kept constant and a normal operation is performed.

As described above, when the induction motor 30 is driven if necessary using the reference torque T2 as a reference and when the required torque T is less than or equal to the reference torque T2, the gas turbine 20 can independently efficiently provide a driving force and the compressor 10 can operate.

Also, the reference torque T2 serving as a reference for starting driving of the induction motor 30 is set to 90% of the rated torque T3 which is the high output section in the stable output range of the gas turbine 20 in advance. For this reason, when the driving of the induction motor 30 is started, it is unnecessary to synchronize the induction motor 30 with the gas turbine 20 in an unstable state in the vicinity of the rated torque T3 of the gas turbine 20 and it is also unnecessary to decrease an already set turbine output torque Tt to restore the turbine output torque Tt to a stable state. That is, when an output of the turbine output torque Tt is increased by setting the reference torque T2 in a stable range, for example, 90% of the rated torque T3, the compressor 10 can operate by allowing a smooth transition from an output by the independent gas turbine 20 to an output by the gas turbine 20 and the induction motor 30.

On the other hand, at time t=t6, when a command is input from the plant control unit 2 to decrease a pressure of a compressed gas using the compressor 10, the required torque T is calculated at each time so that the turbine output torque Tt and the electric motor output torque Tm decrease (Step S7).

At time t=t8, the turbine output torque Tt is decreased until the turbine output torque Tt reaches the lower limit T1 of the stable output range of the gas turbine 20. At that time, when the electric motor output torque Tm has decreased to the minimum torque Tm1, the induction motor 30 is stopped (Step S8 and Step S9).

As described above, according to the compressor unit 1 and the compressor control device 12 installed in the compressor unit 1 in the embodiment, since the output determination unit 12b and the drive source command unit 12c are provided, it is possible to operate the compressor 10 stably and efficiently with a desired output.

Particularly, in the embodiment, a ground fault detection in the induction motor 30 becomes possible by setting the induction motor 30 to the minimum torque Tm1 or higher when the turbine output torque Tt is at least greater than or equal to the lower limit T2 in the stable output range of the gas turbine 20. Furthermore, it is possible to reduce a difference between the required torque T and an actual sum torque of the gas turbine 20 and the induction motor 30 by setting the turbine output torque Tt to a torque obtained by subtracting the electric motor output torque Tm from the required torque T.

Also, the reference torque T2 to start driving of the induction motor 30 is set in the stable output range of the gas turbine 20 in advance and it is unnecessary to synchronize the induction motor 30 with the gas turbine 20 in an unstable state in the vicinity of a rated output of the gas turbine 20 when the driving of the induction motor 30 is started. That is, the compressor 10 can operate by allowing a smooth transition from an output by the independent gas turbine to an output by the gas turbine 20 and the induction motor 30 and it is possible to omit waste of falling and raising the turbine output torque Tt once as in the related art.

Also, by adopting the induction motor 30 as an electric motor, for example, it is possible to reduce the manufacturing costs as compared with a DC electric motor.

By adopting an inverter having no regeneration function as an inverter of the electric motor control device 32, the manufacturing costs can be reduced.

Although the embodiment of the present invention has been described in detail above with reference to the drawings, a specific configuration is not limited to the embodiment and includes changes in design and the like without departing from the scope of the present invention.

For example, a configuration is provided so that the required torque T exceeds the reference torque T2 and then an output of the gas turbine 20 is increased to the rated torque T3 and each output of the gas turbine 20 and the induction motor 30 is distributed in the above-described embodiment, but the present invention is not limited thereto. That is, after the required torque T exceeds the reference torque T2, the output of the gas turbine 20 may be kept constant at the reference torque T2 and the increasing of the required torque T after that may be output from the induction motor 30.

Also, the gas turbine 20 is assumed to be a turbine configured to operate the compressor 10 in the compressor unit 1 in each embodiment, but the present invention is not limited thereto. For example, a steam turbine may be adopted. Furthermore, each control device of the compressor 10, the gas turbine 20, and the induction motor 30 is assumed to be independent, but the present invention is not limited thereto. They may be configured as an integral control device. Moreover, the compressor control device 12 controls the compressor 10 on the basis of the command from the external plant control unit 2 and instructs the gas turbine 20 and the induction motor 30, but the present invention is not limited thereto. For example, the compressor control device 12 may include an operation part and perform control independently from the outside on the basis of an input through the operation part.

REFERENCE SIGNS LIST

1 Compressor unit
2 Plant control unit
10 Compressor
11 Compressor main body
12 Compressor control device
12*a* Required output setting unit
12*b* Output determination unit
12*c* Drive source command unit
13 Rotating shaft
20 Gas turbine
21 Turbine main body
22 Turbine control device
23 Turbine output shaft
30 Induction motor
31 Electric motor main body
32 Electric motor control device
32*a* Ground fault detection unit
31 Electric motor output shaft
T Required torque
T1 Lower limit of stable output range
T2 Reference torque
Tm Electric motor output torque
Tt Turbine output torque

What is claimed is:

1. A control device for a rotary machine which is driven by a turbine output torque which is an output of a turbine and an electric motor output torque which is an output of an induction motor, the control device comprising:
a required output setting unit configured to set a required torque for driving the rotary machine;
an output determination unit configured to determine whether the turbine output torque of the turbine has reached a lower limit of a stable output range of the gas turbine; and
a drive source command unit configured to drive the turbine and the induction motor,
wherein, in response to the output determination unit determining that the turbine output torque has reached the lower limit in the stable output range of the turbine, the drive source command unit starts the induction motor and sets the electric motor output torque to a value not to be lower than a minimum torque in which the induction motor is capable of outputting in a stable state, and the drive source command unit maintains the required torque to be constant and not to deviate from the required torque set by the required output setting unit by setting the turbine output torque to a value obtained by subtracting the electric motor output torque from the required torque.

2. The control device for a rotary machine according to claim 1,
wherein the output determination unit is configured to determine whether the required torque exceeds a reference torque set in advance in the stable output range of the turbine, and
wherein the drive source command unit sets a torque of the induction motor to a value not to be lower than the minimum torque in response to the output determination unit determining that the required torque exceeds the reference torque.

3. A rotary machine unit, comprising:
a turbine and an induction motor as driving sources;
a rotary machine connected to the turbine and the induction motor; and
a control device for the rotary machine driven by a turbine output torque, which is an output of the turbine, and an electric motor output torque, which is an output of the induction motor,
wherein the control device comprises:
a required output setting unit configured to set a required torque for driving the rotary machine;
an output determination unit configured to determine whether the turbine output torque of the turbine has reached a lower limit of a stable output range of the gas turbine; and
a drive source command unit configured to drive the turbine and the induction motor,
wherein, in response to the output determination unit determining that the turbine output torque has reached the lower limit in the stable output range of the turbine, the drive source command unit starts the induction motor and sets the electric motor output torque to a value not to be lower than a minimum torque in which the induction motor is capable of outputting in a stable state, and the drive source command unit maintains the required torque to be constant and not to deviate from the required torque set by the required output setting unit by setting the turbine output torque to a value obtained by subtracting the electric motor output torque from the required torque.

4. A control method for a rotary machine which is driven by a turbine output torque which is an output of a turbine and an electric motor output torque which is an output of an induction motor, the control method comprising:
a step of setting a required torque for driving the rotary machine;
a step of determining whether the turbine output torque of the turbine has reached a lower limit of a stable output range of the gas turbine; and
a step of starting the induction motor and setting the electric motor output torque to a value not to be lower than a minimum torque in which the induction motor is capable of outputting in a stable state, and maintaining the required torque to be constant and not to deviate from the required torque set in the step of setting a required torque by setting the turbine output torque to a value obtained by subtracting the electric motor output torque from the required torque in response to the turbine output torque reaching the lower limit in the stable output range of the turbine.

5. The control method for a rotary machine according to claim 4, further comprising:
a step of determining whether the required torque exceeds a reference torque set in advance in the stable output range of the turbine; and
a step of setting a torque of the induction motor to a value not to be lower than the minimum torque in response to the required torque exceeding the reference torque.

* * * * *